(12) United States Patent
Damgar et al.

(10) Patent No.: US 12,118,225 B1
(45) Date of Patent: Oct. 15, 2024

(54) MANAGING RETAINED CONTAINER OBJECTS IN STORAGE HAVING REFERENCED CHUNKS REFERENCED IN OTHER OBJECTS

(71) Applicant: INTERNATIONAL BUSINESS MACHINES CORPORATION, Armonk, NY (US)

(72) Inventors: James Edward Damgar, Pima, AZ (US); Errol Jay Calder, Vail, AZ (US); Astrid O Brockman, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 18/186,569

(22) Filed: Mar. 20, 2023

(51) Int. Cl.
*G06F 3/06* (2006.01)
(52) U.S. Cl.
CPC .......... *G06F 3/0644* (2013.01); *G06F 3/0604* (2013.01); *G06F 3/067* (2013.01)
(58) Field of Classification Search
CPC ....... G06F 3/0644; G06F 3/0604; G06F 3/067
See application file for complete search history.

(56) References Cited

U.S. PATENT DOCUMENTS

| | | | | |
|---|---|---|---|---|
| 9,785,643 | B1 * | 10/2017 | Patil ........................ | G06F 11/14 |
| 10,346,297 | B1 | 7/2019 | Wallace | |
| 2022/0083514 | A1 * | 3/2022 | Rath ................... | G06F 11/1451 |
| 2022/0121529 | A1 | 4/2022 | Rath et al. | |

OTHER PUBLICATIONS

"Introduction to Data Protection Solutions", IBM Corporation, IBM Spectrum Protect Version 8.1.7, 1993, 70 pp.
"IBM Documentation", IBM Corporation, 8 pp., [online][retrieved Feb. 26, 2023] https://www.ibm.com/docs/en/spectrum-protect/8.1.14?topic=concepts-s . . . .
J. Basler, et al., "Effective Planning and Use of IBM Spectrum Protect Container Storage Pools and Data Deduplication", BM Corporation, IBM Spectrum Protect Version , Document Version 3.1, 2017, 49 pp.

* cited by examiner

*Primary Examiner* — Francisco A Grullon
(74) *Attorney, Agent, or Firm* — KONRAD, RAYNES, DAVDA & VICTOR; David Victor

(57) ABSTRACT

Provided are a computer program product, system, and method for managing retained container objects in storage having referenced chunks referenced in other objects. Reference counts are maintained for referenced chunks in a container object indicating a number of references to the referenced chunks in at least one application object resulting from deduplication. The container object is indicated as reclaim eligible while the reference counts for at least one of the referenced chunks for the container object is at least one. A reference count is decremented for one of the referenced chunks in the container object in response to the at least one application object expiring. The container object, including chunks for the container object, is indicated as eligible for deletion when the reference counts for the referenced chunks in the container object are zero and the container object is indicated as reclaim eligible.

20 Claims, 7 Drawing Sheets

MANAGING RETAINED CONTAINER OBJECTS IN STORAGE HAVING REFERENCED CHUNKS REFERENCED IN OTHER OBJECTS

BACKGROUND OF THE INVENTION

1. Field of the Invention

The present invention relates to a computer program product, system, and method for managing retained container objects in storage having referenced chunks referenced in other objects.

2. Description of the Related Art

Cloud storage platforms may provide immutable object storage that enables the storage of objects by using a WORM (Write-Once-Read-Many) model that prevents objects from being deleted and overwritten for a fixed amount of time. Retention policies ensure that data is stored in a WORM, non-erasable and non-rewritable manner. This policy is enforced until the end of a retention period and the removal of any legal holds. Data immutability has increased in importance as a defense against ransomware/malware that encrypts or modifies data and will not allow recovery unless a ransom is paid. Immutability prevents stored data from being altered, which prevents ransomware from denying access to data.

WORM storage paradigms have recently been adopted within many object storage systems. For example, IBM® Cloud Object Storage (on-premises and in IBM® Cloud) provide for the ability to enable bucket and/or vault "retention" which prevents object overwrite and deletion before a certain number of duration of days. Similarly, Amazon Web Services® (AWS®) allows for enabling "Object Lock" on their Simple Storage Service (S3) buckets in tandem with bucket "versioning" and "retention" to enable immutability for objects stored in those locations. Microsoft® Azure®, Google®, and others offer similar functionality. (IBM is a trademark of International Business Machines Corporation throughout the world; AWS, Amazon Web Services are trademarks of Amazon Corporation throughout the world; Microsoft and Azure are trademarks of Microsoft Corporation throughout the world; and Google is trademark of Google LLC throughout the world).

Immutable data may also be subject to data deduplication. IBM® Spectrum® Protect stores deduplicated data within "container" files or objects on disk or object storage. During data ingest, incoming backup data streams are analyzed in-flight, with unique data extents (or "chunks") identified by a fingerprinting algorithm. Optionally, these extents may then be compressed and encrypted before being stored within logical "containers" within a "storage pool". (Spectrum is a trademark of IBM throughout the world).

There is a need in the art for improved techniques to provide both immutability and deduplication in object storage.

SUMMARY

Provided are a computer program product, system, and method for managing retained container objects in storage having referenced chunks referenced in other objects. Reference counts are maintained for referenced chunks in a container object indicating a number of references to the referenced chunks in at least one application object resulting from deduplication. The container object is indicated as reclaim eligible while the reference counts for at least one of the referenced chunks for the container object is at least one. A reference count is decremented for one of the referenced chunks in the container object in response to the at least one application object expiring. The container object, including chunks for the container object, is indicated as eligible for deletion when the reference counts for the referenced chunks in the container object are zero and the container object is indicated as reclaim eligible.

DETAILED DESCRIPTION

Complexity arises when trying to address the storage goals of storage immutability, data deduplication, retention, and expiration in an efficient manner. Over time, different versions of front-end client data (files or "objects") may evolve to logically map to different sets of deduplicated extents residing in potentially many containers. This proliferation of different objects mapping to different deduplicated extents in different containers increases the complexity of managing immutability and retention rules that may conflict.

Described embodiments provide improvements to computer storage technology by allowing for data immutability and retention of chunks of application data in container objects while allowing for data deduplication to reduce the storage footprint. Described embodiments manage immutability and deduplication by providing reference counts with chunk data in containers indicating a number of deduplication references in application objects to the chunk data in the containers. Containers that have chunks with reference counts that satisfy a criteria may be indicated as reclaim eligible, which allows the reference counts to decrement while preventing new application objects from referencing chunks in the container having reclaim eligible status. The reclaim eligible containers may be removed once the reference counts for the referenced chunks in the containers decrement to zero. In this way, described embodiments allow retention rules to be enforced while ensuring that referenced chunks remain available.

Figure 1:
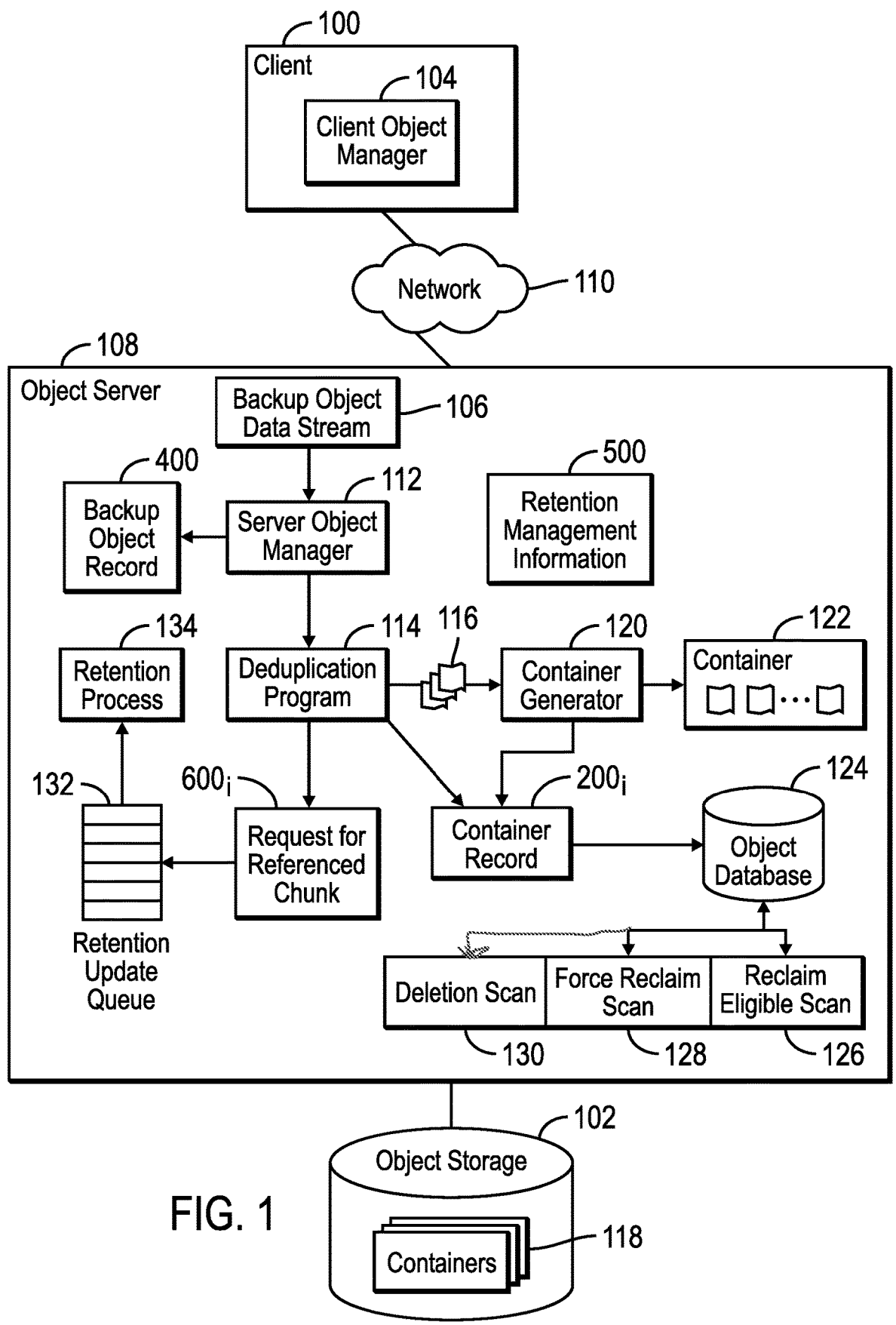
FIG. 1 illustrates an embodiment of a computing environment.

FIG. 1 illustrates an embodiment of a cloud computing environment to store backup objects from a client 100 in an object storage 102. The client 100 includes a client object manager 104 to form a backup object 106 of a data stream to send to an object server 108 over network 110. A server object manager 112 ingests the backup object data stream 106 or other application objects, and forwards the data stream 106 to a deduplication program 114 to determine data chunks 116 in the data stream 112 and if any of the determined chunks 116 match chunks in stored container objects 118. The deduplication program 114 forwards the data chunks 116 that are not deduplicated, i.e., not found in other containers 118, to a container generator 120 to generate a container 122 of the chunks 116 that were not deduplicated. The container 122 may then be stored in the object storage 102. Data chunks may comprise contiguous segments of data, also known as extents, and may have variable size.

The container generator 120 may generate a container record $200_i$ for the generated container 122 having container chunk information $300_i$ on the data chunks in the container 122 that is stored in an object database 124, such as a relational database, object oriented database, etc. The server object manager 112 may further generate a backup object record $400_i$, also referred to as an application object, having information on the storage of the chunks of the backup object 106 in one or more containers 122 or deduplicated references to chunk data in other containers. The backup object record $400_i$ is stored in the object database 124, and provides a representation of the backup object or application object.

The deduplication program 114, when determining references to matching chunks in stored containers 118 for a new backup object 106, may generate a request for a referenced chunk 600 (FIG. 6) having information to update the container records $200_i$ having the referenced chunks. Requests for a referenced chunk 600 may be stored in a retention update queue 132 that is processed periodically by retention process 134 to update container records $200_i$ for containers having referenced chunks determined by the deduplication program 114. A container, also referred to as container object, comprises a logical grouping of data for object storage, and may be designed for data deduplication. In alternative embodiments, data chunks for a backup object may be grouped in logical groupings other than a container.

Processes to manage the backup objects stored in the object storage 102 include a reclaim eligible scan 126 to determine containers that are reclaim eligible and can no longer be used for deduplication references from other backup objects, a force reclaim scan 128 to determine when to delete stored containers 118 and their data chunks that are reclaim eligible, and a deletion scan 130 to determine when to delete containers exceeding their retention period. These processes may utilize retention management information 500 having thresholds used to determine when to reclaim, expire, and delete objects.

The object server 102 may comprise an object server, such as the Business Machines Corporation (IBM) Spectrum® server to provide a single point of backup and recovery for client nodes 104 in a network 110. Deduplication may occur within the object server 102 as a whole. Deduplication may be performed by a single monolithic process or several microservices/processes. In certain embodiments, the client object manager 104 may provide the deduplication of the chunks of data. The client object manager 104 may then forward the deduplication information on chunk references to the server object manager 112 to use to generate the containers 122, container records 200, and backup object records 400. The client object manager 104 may work in tandem with the object server 102 to process the data stream.

The object storage 102 may comprise storage pools that are configured to store different types of client data with specific retention, encryption and other management parameters to manage and expire containers 118 in the specific storage pools.

The program components of FIG. 1, including components 104, 112, 116, 120, 126, 128, 130, 134, may comprise program code loaded into a memory and executed by one or more processors. Alternatively, some or all of the functions may be implemented as microcode or firmware in hardware devices, such as in Application Specific Integrated Circuits (ASICs).

The object storage 108 may comprise one or more non-volatile storage devices known in the art, such as a solid state storage device (SSD) comprised of solid state electronics, NAND storage cells, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The network 110 may comprise a Storage Area Network (SAN), a Local Area Network (LAN), a Wide Area Network (WAN), the Internet, and Intranet, etc.

Figure 2:
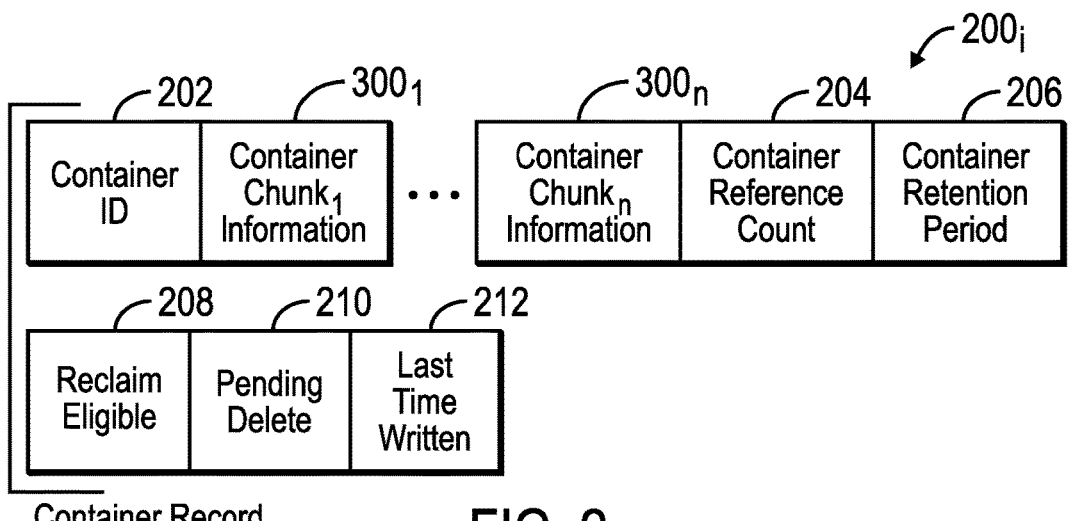
FIG. 2 illustrates an embodiment of a container record.

FIG. 2 illustrates an embodiment of an instance of a container record $200_i$ for a container 122 to add to the storage 102, and includes: a container identifier (ID) 202; one or more instances of container chunk information $300_1 \ldots 300_n$ for each chunk stored in the container; a container reference count 204 indicating a number of times chunks in the container 202 have been referenced in other containers; a container retention period 206 indicating a time the container must be retained before deleted, which may be initially set to the storage retention period and increased as deduplication references to chunks in the container occur; a reclaim eligible flag 208 indicating whether the container is reclaim eligible and can no longer have chunks referenced in other backup objects through deduplication; a pending delete 210 set to indicate the container 202 is eligible for deletion when its retention period 206 expires or another delete condition occurs; and a last time written 212 indicating a last time the container chunk information $300_1 \ldots 300_n$ or container retention period 206 was updated.

Figures 3, 4:
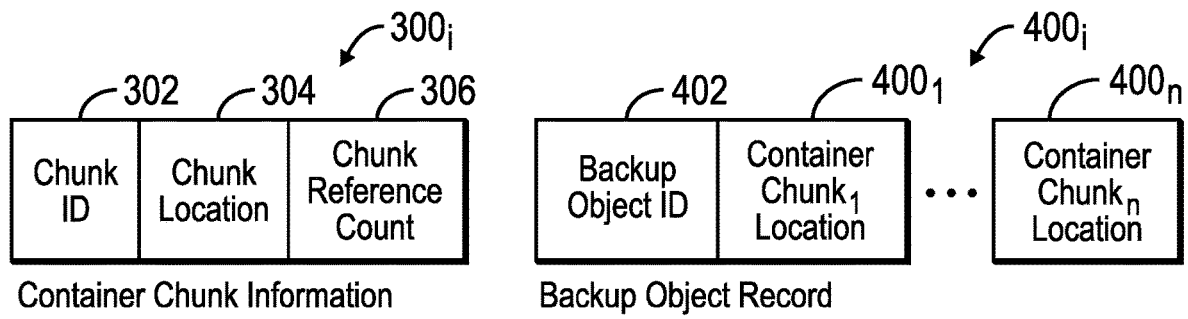
FIG. 3 illustrates an embodiment of container chunk information.
FIG. 4 illustrates an embodiment of a backup object record.

FIG. 3 illustrates an embodiment of a container chunk information instance $300_i$ included in the container record $200_i$ for each chunk in the container $200_i$ may include: a chunk ID 302; a chunk location in the container 304 for the container record $200_i$ indicating where in the container 202 the chunk 302 is located; and a chunk reference count 306 indicating a number of times the chunk has 302 been referenced in other containers 118 from deduplication.

FIG. 4 illustrates an embodiment of a backup object record $400_i$ created for a backup object of chunks of data received from a client 100, and includes: a backup object ID 202 and one or more chunk locations $404_1 \ldots 404_n$ for the chunks in the backup object 126. The chunk location $404_i$ indicates a container 118 in which the data for the chunk is located or a reference to a chunk in another container 118, which was generated for another backup object received earlier or indicates expired when the data has expired due to an application or backup retention period.

Figure 5:
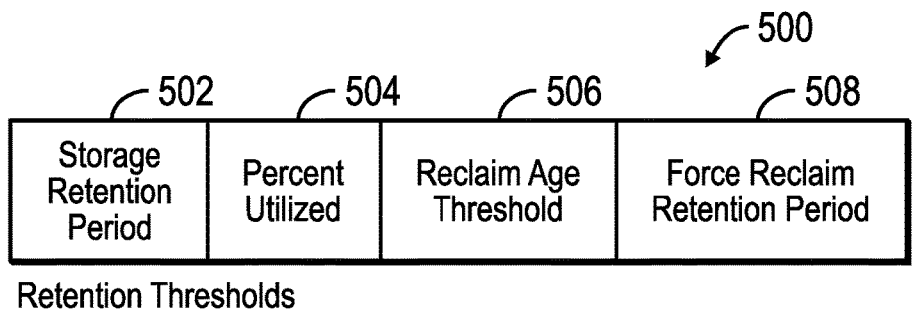
FIG. 5 illustrates an embodiment of retention thresholds.

FIG. 5 illustrates an embodiment of management thresholds 500, including a storage retention period 502, which may be associated with a storage pool in which backup containers are stored and indicate a retention period for the storage; a percent utilized 504 indicating a percentage of chunks having a reference count used to determine whether to reclaim a container 118; a reclaim age threshold 506 indicating a retention period such that a container 118 is reclaim eligible if its age is greater than the reclaim age threshold 506; and a force reclaim retention period indicating when a reclaim eligible container 118 having chunks with reference counts greater than zero may be forced to be deleted by having their chunks copied to a new container. In certain embodiments, the container retention period 206 may be initially set to the storage retention period 502 and the force reclaim retention period 508 may be set to some multiple of the storage retention period 502 or another value.

Figure 6:
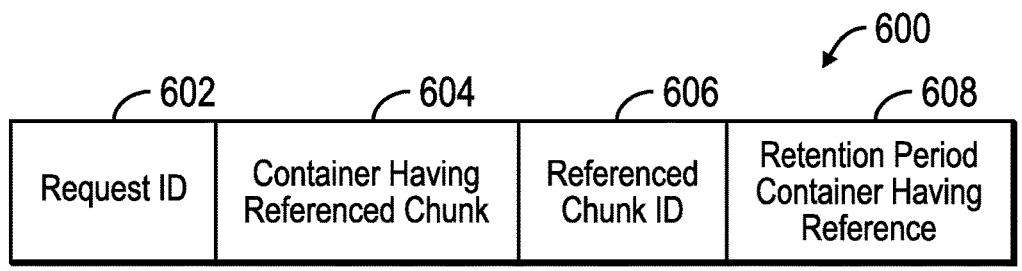
FIG. 6 illustrates an embodiment of a referenced chunk request.

FIG. 6 illustrates a referenced chunk request 600 generated by deduplication program 114 to update container records 118 having chunks referenced for deduplication index, and includes: a request ID 602 for the request; a container 604 having the referenced chunk resulting from deduplication; a referenced chunk ID 606 in the container 604; and a retention period 608 of the container in which the reference is included so that the retention period of the container having the referenced chunk can be set to the retention period of the container having the reference. This ensures that the container having the referenced chunk is not deleted while the container having the reference is active and maintains the reference, so that the chunk data will be available to the container having the reference to the chunk.

Figure 7:
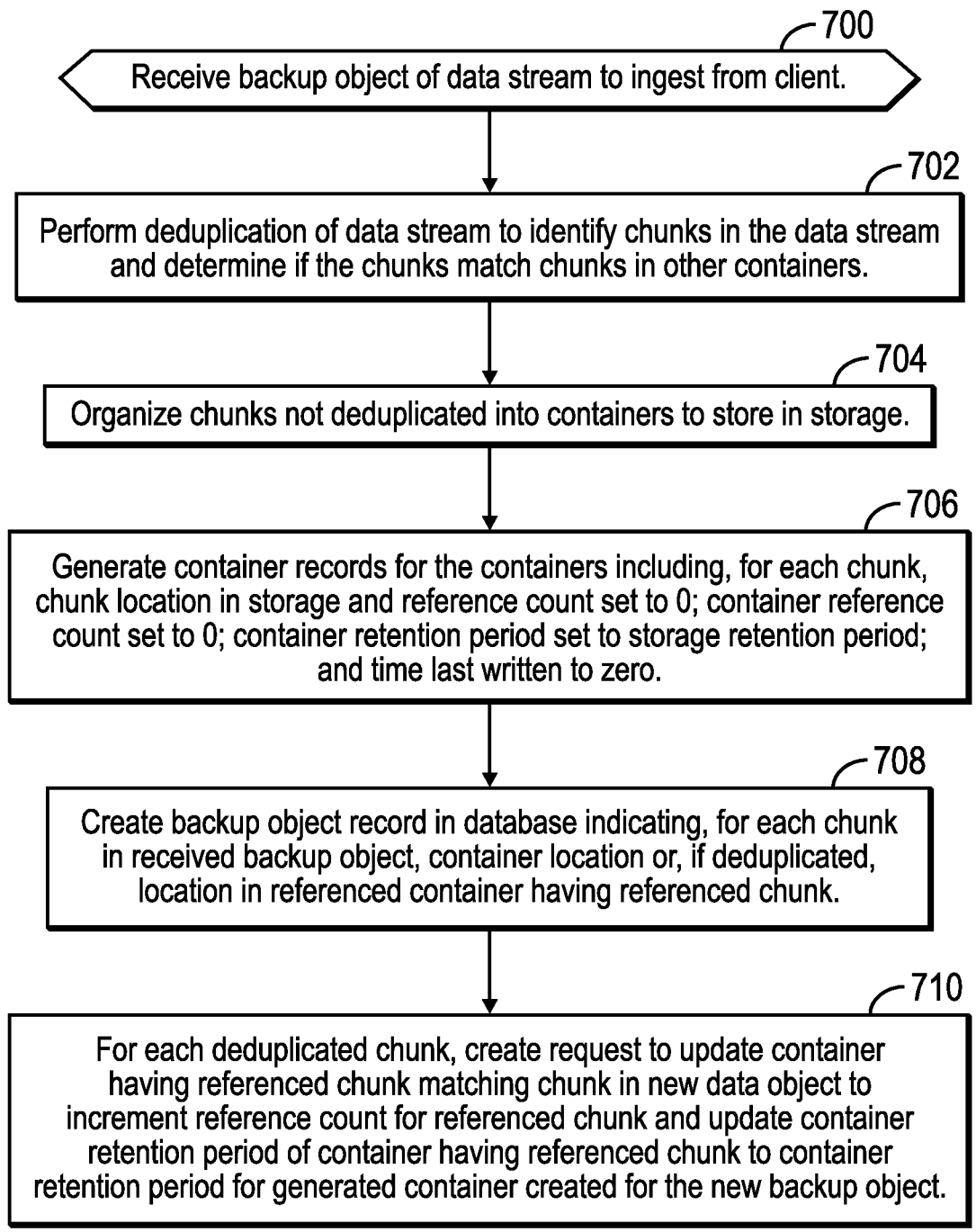
FIG. 7 illustrates an embodiment of operations to ingest a backup object of chunks of data.

FIG. 7 illustrates an embodiment of operations performed by the server object manager 112, deduplication program 114, and container generator 120 to process a backup object data stream 106 received from a client 100. Upon receiving (at block 700) a backup object data stream 106 to ingest from a client 100, the deduplication program 114 performs (at block 702) deduplication of the data stream 106 to identify chunks 116 in the data stream of the backup object 106 and determine the chunks in the backup object data stream 106 that match chunks in other stored containers 118. The deduplication procedure, which identifies variable-length chunks/extents, can take place at the object server 108 or at the client 100 working in tandem with the object server 108.

For chunks that are not deduplicated, i.e., do not match chunks in stored containers 118, the container generator 120 organizes (at block 704) the non-deduplicated chunks into one or more containers 122 to store in the object storage 102. The container generator 120 generates (at block 706) container records $200_i$ for the generated containers 122 including, for each chunk i, chunk information $300_i$ including a chunk location 304 in storage 118 at which the chunk is stored and a reference count 306 set to 0 to indicate no deduplication references yet to the chunk. A container reference count 204 is set to zero, the container retention period 206 is set to the storage retention period 502, and last time written set 212 to an initial value. Upon initialization of the container record $200_i$, the reclaim eligible 208 and pending delete 210 indicate not set or negative for those flags.

The server object manager 112 may create (at block 708) backup object record $400_i$, or application object record, in the database 124 indicating, for each chunk in the received backup object 126, the container location having data for the chunk or, if deduplicated, location in a referenced container having the referenced chunk data. For each deduplicated chunk, the deduplication program 114 may create (at block 710) a request 600 to update the container record $200_i$ having the referenced chunk matching the chunk in the new backup object record $400_i$ to increment the reference count 306 for the referenced chunk and to update the container retention period 206 having the referenced chunk to match the retention period of the generated container for the new backup object 126.

With the embodiment of FIG. 7, upon ingesting a backup object, reference counts are maintained for referenced chunks in the container for which they are stored. A reference count for a chunk in a container 118 is incremented when the chunk is referenced in an ingested backup object 126. Further, a retention time for the container including the referenced chunk is set to the retention time for the container including the reference to the referenced chunk so that the container having the data for the referenced chunk will not be removed before the container referencing that referenced chunk because they now have the same retention period.

Figure 8:
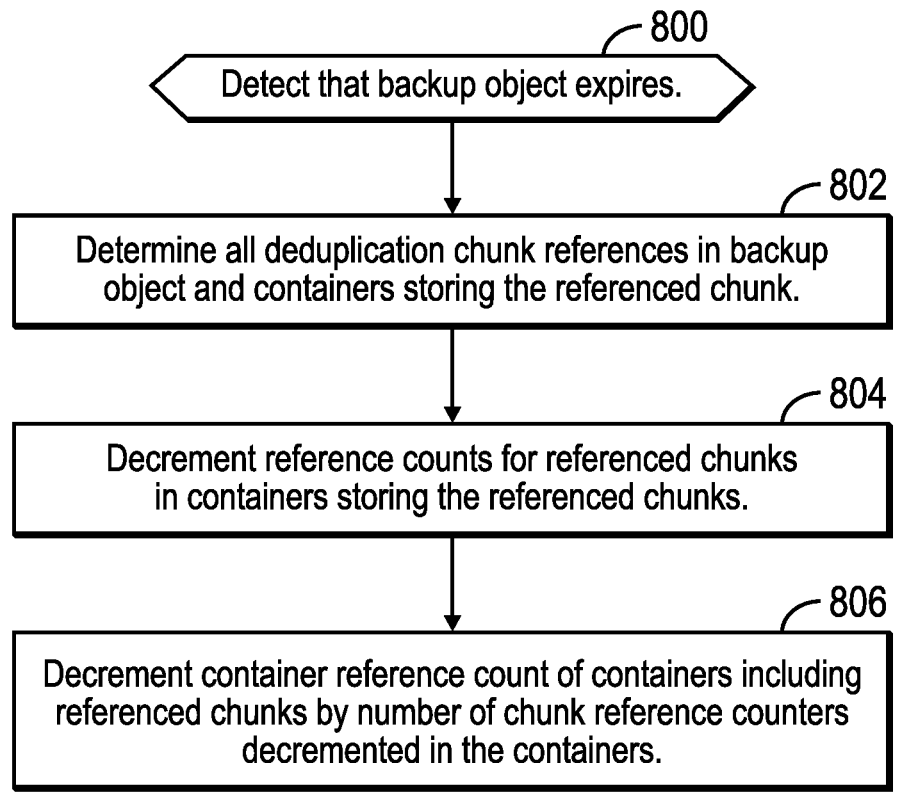
FIG. 8 illustrates an embodiment of operations to perform when a backup object expires.

FIG. 8 illustrates an embodiment of operations performed by the server object manager 112 upon detecting that a backup object $400_i$ has expired according to a backup criteria. Upon detecting (at block 800) that a backup object $400_i$ has expired, the server object manager 112 determines (at block 802) all deduplication chunk references in chunk locations $404_i$ of the backup object $400_i$ and the containers 118 storing the referenced chunk. The reference counts 306 in the chunk information $300_i$ in the container records $200_i$ for the containers 118 storing the referenced chunks in the expired backup object are decremented (at block 804). The container reference count 204 in the containers storing the referenced chunk is decremented (at block 806) by the number of chunk reference counters 306 in the container that are decremented.

With the embodiment of FIG. 8, when a backup object or other application object are expired, then the chunks referenced in that backup object stored in containers 118 may have their chunk reference counters 306 decremented because there is one less backup object referencing those chunks. Once all reference counters 306 for a container record $200_i$ are zero, the container $200_i$ and all its chunks may be safely deleted without effecting data in remaining backup objects because there are no more backup objects referencing chunks in that container.

Figure 9:
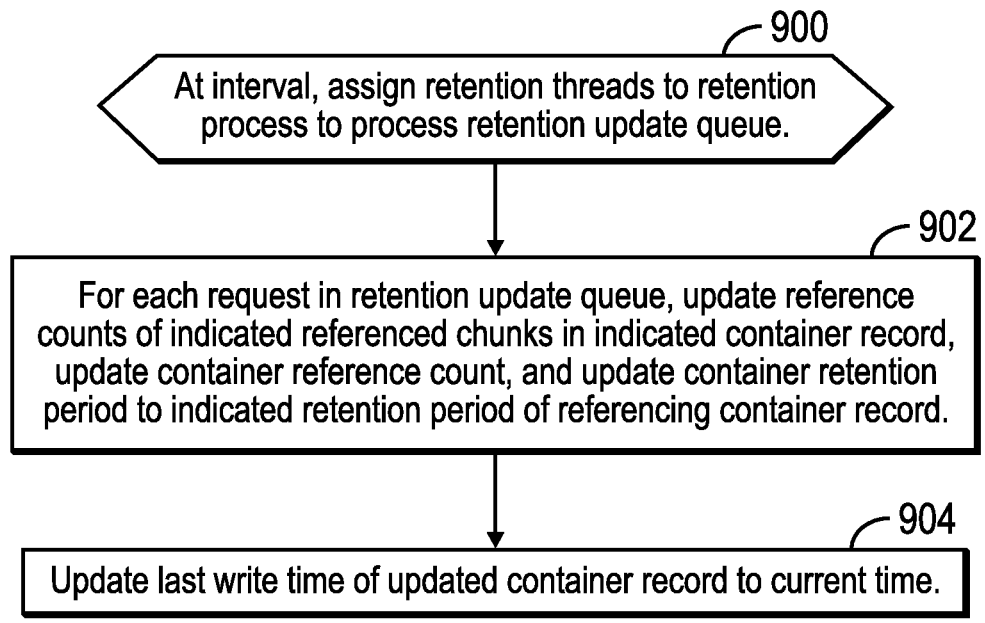
FIG. 9 illustrates an embodiment of operations to process referenced chunk requests in a queue.

FIG. 9 illustrates an embodiment of operations performed by the retention process 134 to process the retention update queue 132 to process referenced chunk requests 600 to update information for containers records $200_i$ having chunks referenced in newly ingested backup objects 126. At an interval, retention threads are assigned (at bock 900) to the retention process 136 to process the retention update queue 132. For each request 600 in the queue 132, the retention process 134 updates (at block 902) reference counts 306 of indicated referenced chunks 606 in the indicated container record 604, updates the container reference count 204 by the number of chunk reference counts 306 in the container record $200_i$ updated, and updates the container retention period 206 to the retention period of referencing container record 608 indicated in the referenced chunk request 600. For each container record $200_i$ updated, the last time written 212 is updated (at block 904) to current time.

With the embodiment of FIG. 9, when an ingested backup object 126 references a chunk in another container as part of deduplication, then the reference counts for the referenced chunks are updated and the container retention period is updated so that container having the referenced chunk will retained as long as the container referencing that chunk is active. This ensures the immutability of the containers. When applying retention rules to containers having referenced chunks, the referenced chunks will not be deleted leaving the referencing container missing the referenced chunks.

Figure 10:
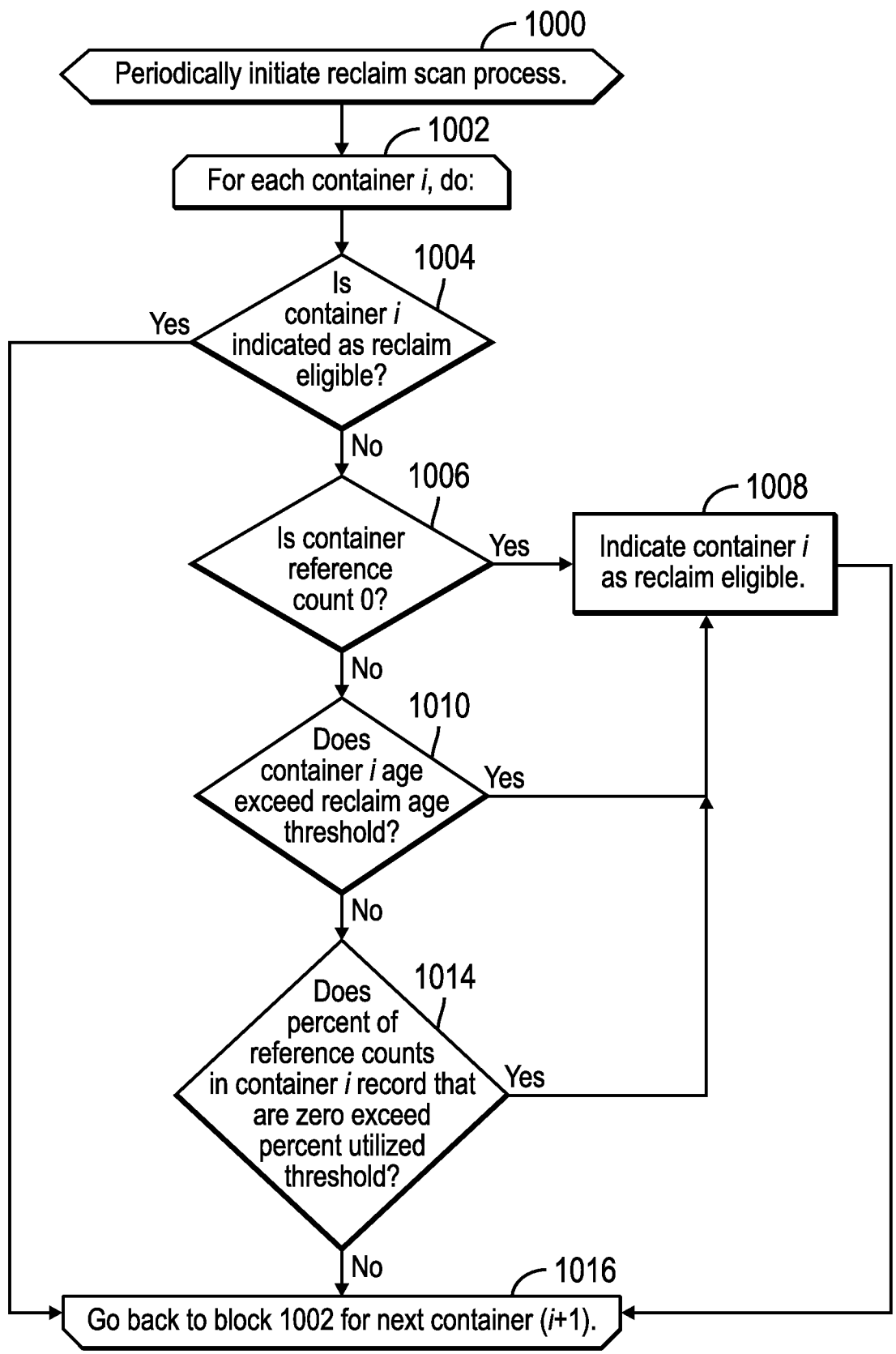
FIG. 10 illustrates an embodiment of operations to reclaim containers.

FIG. 10 illustrates an embodiment of operations performed by the reclaim scan process 126 to periodically scan containers to determine if they are reclaim eligible and may be reclaimed to free space in the object storage 102. Upon initiating (at block 1000) the reclaim scan process 126 performs a loop of operations at blocks 1002 through 1016 for each container i in the storage 102. If (at block 1004) container i is already indicated as reclaim eligible 208, in the container record $200_i$ for container i, then control proceed to block 1016 to consider the next container (i+1). If (at block 1004) the container i is not indicated as reclaim eligible 208, then if (at block 1006) the container reference count 204 is zero, indicating all chunks have reference counts 306 of zero, then the container i is indicated (at block 1008) as reclaim eligible by setting the reclaim eligible flag 208 in the container i record $200_i$ for container i. Alternatively, the container i may not be deleted at this point and may remain in storage 102 until its container retention period 206 expires. If (at block 1006) the container reference count 204 is greater than zero and if (at block 1010) the container i age in storage 102 exceeds the reclaim age threshold 506, then the container i record $200_i$ is indicated (at block 1008) as reclaim eligible by setting the reclaim eligible 208 flag. If (at block 1010) the container i age does not exceed the reclaim age threshold 506, then if (at block 1014) a percent of reference counts 306 for chunks in container i record $200_i$ that are zero exceeds a percent utilized threshold 504, then the container i record $200_i$ is indicated (at block 1008) as reclaim eligible 208. After indicating reclaim eligible (at block 1008) or from the NO branch of block 1014 or from the YES branch of block 1004, control proceeds (at block 1016) back to block 1002 to consider the next container (i+1) in the storage 102 until all containers 118 are considered.

In the embodiment of FIG. 10, there are both age based (block 1010) and space based (at block 1014) conditions on whether to indicate the container as reclaim eligible. In a further embodiment, there may only be one condition, such as just an age based condition (at block 1010) or just a space-based condition (at block 1014). Further, there may be other conditions to consider to make reclaim eligible.

With the embodiment of FIG. 10, a container 118 is indicated as reclaim eligible if it satisfies certain constraints as to its age in storage and the amount of chunks that may be expired, i.e., are not referenced in other containers. Once a container is marked as reclaim eligible, it is not deleted. Instead, other containers cannot reference chunks in a container marked reclaim eligible. Further, during the time a container with chunks having reference counts greater than zero is marked reclaim eligible, the reference counts of the container may be decremented to zero as the backup objects $400_i$ including references to the referenced chunks expire as described in FIG. 8. This allows containers to have the references to their chunks expire and once all reference counts in the reclaimed container are zero, the reclaimed container may be deleted.

Figure 11:
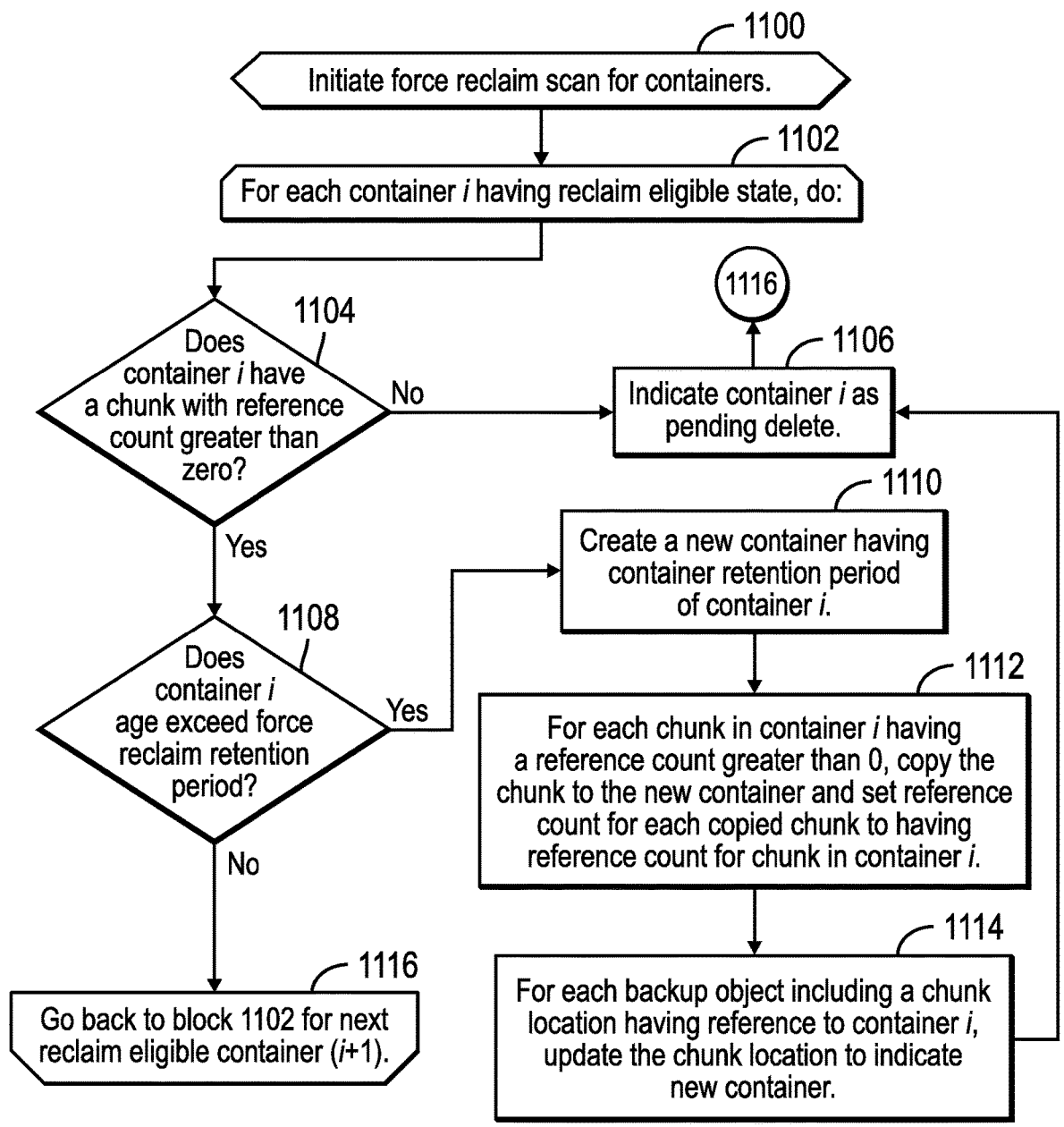
FIG. 11 illustrates an embodiment of operations to force a reclaim scan for a container.

FIG. 11 illustrates an embodiment of operations performed by the force reclaim scan 128, which may be periodically executed to force delete a container if referenced chunks if conditions are satisfied. Upon initiating (at block 1100) the force reclaim scan 128, a loop of operations is performed at blocks 1102 through 1116 for each container i indicated as reclaim eligible 208. If (at block 1104) the container i record $200_i$ does not have a chunk with a reference count 306 greater than zero, then that container i is indicated (at block 1106) as pending delete by setting the pending delete 210 flag. At the point a container i has no referenced chunks, i.e., no reference counter 306 greater than zero, and that container i and its chunks may be deleted later when the container retention period 206 expires.

If (at block 1104) container i does have a reference count greater than zero, i.e., it has referenced chunks, then if (at block 1108) the container i age in storage 102 exceeds a force reclaim retention period 508, indicating a maximum time containers may remain in the storage 102, such as a storage pool, then a new container is created (at block 1110) having a container retention period 206 of container i. For each chunk $300_i$ in container i having a reference count 306 greater than 0, that chunk is copied (at block 1112) to the new container and the reference count 306 for each copied chunk is set to the reference count 306 for the chunk in container i. In this way, the referenced chunks are moved to a new container that has the retention period 206 of the previous container i so that the new container will remain while there are other backup objects referencing the referenced chunks in the new container. For each backup object $400_i$ including a chunk location $404_i$ having a reference to container i, the chunk location $404_i$ is updated (at block 1114) to indicate the new container. The container i is then indicated (at block 1106) as pending delete because in the reclaimed state it will no longer be relied upon for deduplication references. From the no branch of block 1108 and block 1106, control proceeds to block 1116 to consider a next reclaimed container (i+1).

With the embodiment of FIG. 11, when a container has been in storage 102 longer than a force reclaim retention period 508, then that container will be deleted. However, if there are deduplication references in other containers to the container, the described embodiments move referenced chunks in the container eligible for removal due to the force reclaim retention period 508 to a new container so the container and its chunks may be deleted per the storage retention requirements. Backup objects that have current references to the referenced chunks in the container are updated to reference the chunks in the new container. Overall free space is increased by this process because the surviving new container likely has fewer chunks than the container it replaces.

Figure 12:
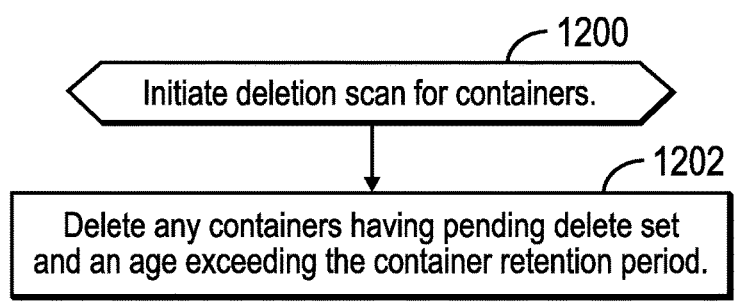
FIG. 12 illustrates an embodiment of operations to delete containers when their container retention period expires.

FIG. 12 illustrates an embodiment of operations performed by a deletion scan 130 that periodically executes. Upon initiating (at block 1200) the deletion scan 130, the deletion scan 130 deletes (at block 1202) any containers 118 and their chunks and container records $200_i$ for containers indicated as pending delete in field 210 and having an age exceeding their container retention period 206. At this point, containers having the pending delete 210 flag set indicating the pending delete state may now be deleted because their age now exceeds the container retention period 206. Because the container retention period 206 has been extended to the container retention period of containers for backup and application objects referencing chunks in that container, there should be no more references to the chunks in that container having an age exceeding its container retention period 206.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation or garbage collection, but this does not render the storage device as transitory because the data is not transitory while it is stored.

Figure 13:
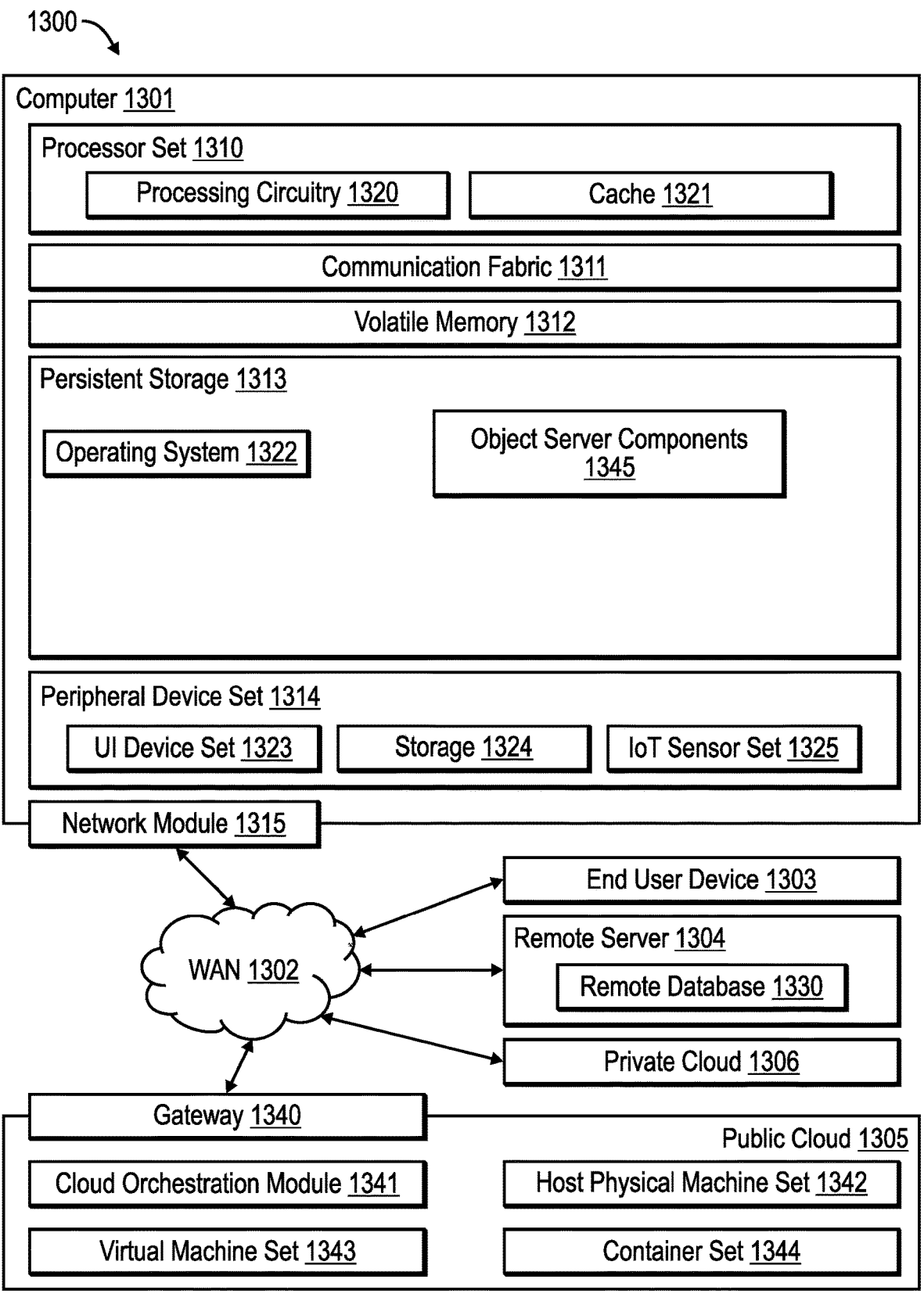
FIG. 13 illustrates a computing environment in which the components of FIG. 1 may be implemented.

In FIG. 13, computing environment 1300 contains an example of an environment for the execution of at least some of the computer code involved in performing the inventive methods, including indicating containers of chunks in storage as reclaim eligible to prevent further deduplication references to chunks in the reclaimed container while reference counts for the referenced chunks in the reclaimed container are allowed to go to zero before deleting the container.

The computing environment 1300 includes, for example, computer 1301, wide area network (WAN) 1302, end user device (EUD) 1303, remote server 1304, public cloud 1305, and private cloud 1306. In this embodiment, computer 1301 includes processor set 1310 (including processing circuitry 1320 and cache 1321), communication fabric 1311, volatile memory 1312, persistent storage 1313 (including operating system 1322 and block 1301, as identified above), peripheral device set 1314 (including user interface (UI) device set 1323, storage 1324, and Internet of Things (IoT) sensor set 1325), and network module 1315. Remote server 1304 includes remote database 1330. Public cloud 1305 includes gateway 1340, cloud orchestration module 1341, host physical machine set 1342, virtual machine set 1343, and container set 1344.

COMPUTER 1301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1330. As is well understood in the art of computer technology, and depending upon the technology, performance of a computer-implemented method may be distributed among multiple computers and/or between multiple locations. On the other hand, in this presentation of computing environment 1300, detailed discussion is focused on a single computer, specifically computer 1301, to keep the presentation as simple as possible. Computer 1301 may be located in a cloud, even though it is not shown in a cloud in FIG. 13. On the other hand, computer 1301 is not required to be in a cloud except to any extent as may be affirmatively indicated.

PROCESSOR SET 1310 includes one, or more, computer processors of any type now known or to be developed in the future. Processing circuitry 1320 may be distributed over multiple packages, for example, multiple, coordinated integrated circuit chips. Processing circuitry 1320 may implement multiple processor threads and/or multiple processor cores. Cache 1321 is memory that is located in the processor chip package(s) and is typically used for data or code that should be available for rapid access by the threads or cores running on processor set 1310. Cache memories are typically organized into multiple levels depending upon relative proximity to the processing circuitry. Alternatively, some, or all, of the cache for the processor set may be located "off chip." In some computing environments, processor set 1310 may be designed for working with qubits and performing quantum computing.

Computer readable program instructions are typically loaded onto computer 1301 to cause a series of operational steps to be performed by processor set 1310 of computer 1301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1321 and the other storage media discussed below. The program instructions, and associated data, are accessed by processor set 1310 to control and direct performance of the inventive methods. In computing environment 1300, at least some of the instructions for performing the inventive methods may be stored in persistent storage 1313.

COMMUNICATION FABRIC 1311 is the signal conduction path that allows the various components of computer 1301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1312 is any type of volatile memory now known or to be developed in the future. Examples include dynamic type random access memory (RAM) or static type RAM. Typically, volatile memory 1312 is characterized by random access, but this is not required unless affirmatively indicated. In computer 1301, the volatile memory 1312 is located in a single package and is internal to computer 1301, but, alternatively or additionally, the volatile memory may be distributed over multiple packages and/or located externally with respect to computer 1301.

PERSISTENT STORAGE 1313 is any form of non-volatile storage for computers that is now known or to be developed in the future. The non-volatility of this storage means that the stored data is maintained regardless of whether power is being supplied to computer 1301 and/or directly to persistent storage 1313. Persistent storage 1313 may be a read only memory (ROM), but typically at least a portion of the persistent storage allows writing of data, deletion of data and re-writing of data. Some familiar forms of persistent storage include magnetic disks and solid state storage devices. Operating system 1322 may take several forms, such as various known proprietary operating systems or open source Portable Operating System Interface-type operating systems that employ a kernel. The object server components 1345 includes at least some of the computer code involved in performing the inventive methods, including, but not limited to, the components in the object server of FIG. 1, comprising program components 104, 112, 116, 120, 126, 128, 134.

PERIPHERAL DEVICE SET 1314 includes the set of peripheral devices of computer 1301. Data communication connections between the peripheral devices and the other components of computer 1301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1323 may include components such as a display screen, speaker, microphone, wearable devices (such as goggles and smart watches), keyboard, mouse, printer, touchpad, game controllers, and haptic devices. Storage 1324 is external storage, such as an external hard drive, or insertable storage, such as an SD card. Storage 1324 may be persistent and/or volatile. In some embodiments, storage 1324 may take the form of a quantum computing storage device for storing data in the form of qubits. In embodiments where computer 1301 is required to have a large amount of storage (for example, where computer 1301 locally stores and manages a large database) then this storage may be provided by peripheral storage devices designed for storing very large amounts of data, such as a storage area network (SAN) that is shared by multiple, geographically distributed computers. IoT sensor set 1325 is made up of sensors that can be used in Internet of Things applications. For example, one sensor may be a thermometer and another sensor may be a motion detector.

NETWORK MODULE 1315 is the collection of computer software, hardware, and firmware that allows computer 1301 to communicate with other computers through WAN 1302. Network module 1315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1315 are performed on the same physical hardware device. In other embodiments (for example, embodiments that utilize software-defined networking (SDN)), the control functions and the forwarding functions of network module 1315 are performed on physically separate devices, such that the control functions manage several different network hardware devices. Computer readable program instructions for performing the inventive methods can typically be downloaded to computer 1301 from an external computer or external storage device through a network adapter card or network interface included in network module 1315.

WAN 1302 is any wide area network (for example, the internet) capable of communicating computer data over non-local distances by any technology for communicating computer data, now known or to be developed in the future. In some embodiments, the WAN 1302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1303 is any computer system that is used and controlled by an end user (for example, a customer of an enterprise that operates computer 1301), and may take any of the forms discussed above in connection with computer 1301. EUD 1303 typically receives helpful and useful data from the operations of computer 1301. For example, in a hypothetical case where computer 1301 is designed to provide a recommendation to an end user, this recommendation would typically be communicated from network module 1315 of computer 1301 through WAN 1302 to EUD 1303. In this way, EUD 1303 can display, or otherwise present, the recommendation to an end user. In some embodiments, EUD 1303 may be a client device, such as thin client, heavy client, mainframe computer, desktop computer and so on. In certain embodiments, the EUD 1303 may comprise the client 100 in FIG. 1 and components therein.

REMOTE SERVER 1304 is any computer system that serves at least some data and/or functionality to computer 1301. Remote server 1304 may be controlled and used by the same entity that operates computer 1301. Remote server 1304 represents the machine(s) that collect and store helpful and useful data for use by other computers, such as computer 1301. For example, in a hypothetical case where computer 1301 is designed and programmed to provide a recommendation based on historical data, then this historical data may be provided to computer 1301 from remote database 1330 of remote server 1304. In certain embodiments, the remote database 1330 may comprise the object database 124 of FIG. 1.

PUBLIC CLOUD 1305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1305 is performed by the computer hardware and/or software of cloud orchestration module 1341. The computing resources provided by public cloud 1305 are typically implemented by virtual computing environments that run on various computers making up the computers of host physical machine set 1342, which is the universe of physical computers in and/or available to public cloud 1305. The virtual computing environments (VCEs) typically take the form of virtual machines from virtual machine set 1343 and/or containers from container set 1344. It is understood that these VCEs may be stored as images and may be transferred among and between the various physical machine hosts, either as images or after instantiation of the VCE. Cloud orchestration module 1341 manages the transfer and storage of images, deploys new instantiations of VCEs and manages active instantiations of VCE deployments. Gateway 1340 is the collection of computer software, hardware, and firmware that allows public cloud 1305 to communicate through WAN 1302. In certain embodiments, the network module 1315 including the object server components 1345 and storage 102 (FIG. 1) may be implemented in the public cloud 1305.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1306 is similar to public cloud 1305, except that the computing resources are only available for use by a single enterprise. While private cloud 1306 is depicted as being in communication with WAN 1302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1305 and private cloud 1306 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing data in objects in storage, the computer program product comprising a computer readable storage medium having computer readable program code embodied therein that when executed performs operations, the operations comprising:
    maintaining reference counts for referenced chunks in a container object indicating a number of references to the referenced chunks in at least one application object resulting from deduplication;
    indicating the container object as reclaim eligible while the reference counts for at least one of the referenced chunks for the container object is at least one;
    decrementing a reference count for one of the referenced chunks in the container object in response to the at least one application object expiring; and
    indicating the container object, including chunks for the container object, as eligible for deletion when the reference counts for the referenced chunks in the container object are zero and the container object is indicated as reclaim eligible.

2. The computer program product of claim 1, wherein the container object is indicated as reclaim eligible in response to one of:

an age of the container object in storage exceeds an age threshold; and a threshold percent of the chunks of the container object have reference counts of zero.

3. The computer program product of claim 1, wherein the container object comprises a first container object, wherein the operations further comprise:

receiving a chunk in the first container object;

determining whether the first container object is reclaim eligible;

storing, in a second container object, the received chunk matching the chunk in the first container object in response to determining that the first container object is indicated as reclaim eligible; and storing a reference to the chunk in the first container object matching the received chunk in response to determining that the first container object is not indicated as reclaim eligible.

4. The computer program product of claim 1, wherein the container object comprises a first container object, and wherein the operations further comprise:

determining whether a duration of the first container object exceeds a retention period;

copying chunks in the first container object having a reference count greater than zero to a second container object in the storage; and indicating the first container object as eligible for deletion in response to the chunks in the first container object having the reference count greater than one copied to the second container object.

5. The computer program product of claim 1, wherein the container object comprises a first container object, and wherein the operations further comprise:

indicating the first container object as reclaim eligible in response to the container object being in storage for longer than a first retention period; and in response to the first container object being in the storage longer than a second retention period, performing:

copying chunks in the first container object having a reference count greater than one to a second container object; and indicating the first container object as eligible for deletion in response to the chunks in the first container object having the reference count greater than one copied to the second container object.

6. The computer program product of claim 1, wherein the container object comprises a first container object associated with a first application object, and wherein the operations further comprise:

setting a first container object retention period associated with the first container object to a second container object retention period associated with a second container object storing chunks for a second application object including a reference to one of the referenced chunks in the first container object; and deleting the first container object in response to an age of the first container object exceeding the first container object retention period.

7. The computer program product of claim 1, wherein the container object comprises a first container object, and wherein the operations further comprise:

in response to including a reference to a referenced chunk in the first container object in the at least one application object including a chunk matching the chunk in the first container object, performing:

incrementing a reference count for the referenced chunk in the first container object; and setting a first container object retention period for the first container object to match a second container object retention period for at least one additional container object for the at least one application object including the reference to the referenced chunk in the first container object.

8. The computer program product of claim 7, wherein the operations further comprise:

queuing a request to increment the reference count for the chunk in the first container object and increment the first container object retention period for the first container object in response the including the reference to the chunk in the first container object in the at least one application object; and invoking a retention thread at a retention thread interval to process the queued request to increment the reference count for the chunk in the first container object and to perform the incrementing the first container object retention period.

9. A system for managing data in objects in storage, comprising:

a processor; and a computer readable storage medium having computer readable program code embodied therein that when executed by the processor performs operations, the operations:

maintaining reference counts for referenced chunks in a container object indicating a number of references to the referenced chunks in at least one application object resulting from deduplication;

indicating the container object as reclaim eligible while the reference counts for at least one of the referenced chunks for the container object is at least one;

decrementing a reference count for one of the referenced chunks in the container object in response to the at least one application object expiring; and indicating the container object, including chunks for the container object, as eligible for deletion when the reference counts for the referenced chunks in the container object are zero and the container object is indicated as reclaim eligible.

10. The system of claim 9, wherein the container object is indicated as reclaim eligible in response to one of:

an age of the container object in storage exceeds an age threshold; and a threshold percent of the chunks of the container object have reference counts of zero.

11. The system of claim 9, wherein the container object comprises a first container object, wherein the operations further comprise:

receiving a chunk in the first container object;

determining whether the first container object is reclaim eligible;

storing, in a second container object, the received chunk matching the chunk in the first container object in response to determining that the first container object is indicated as reclaim eligible; and storing a reference to the chunk in the first container object matching the received chunk in response to determining that the first container object is not indicated as reclaim eligible.

12. The system of claim 9, wherein the container object comprises a first container object, and wherein the operations further comprise:

determining whether a duration of the first container object exceeds a retention period;

copying chunks in the first container object having a reference count greater than zero to a second container object in the storage; and indicating the first container object as eligible for deletion in response to the chunks in the first container object having the reference count greater than one copied to the second container object.

13. The system of claim 9, wherein the container object comprises a first container object, and wherein the operations further comprise:

indicating the first container object as reclaim eligible in response to the container object being in storage for longer than a first retention period; and in response to the first container object being in the storage longer than a second retention period, performing:

copying chunks in the first container object having a reference count greater than one to a second container object; and indicating the first container object as eligible for deletion in response to the chunks in the first container object having the reference count greater than one copied to the second container object.

14. The system of claim 9, wherein the container object comprises a first container object associated with a first application object, and wherein the operations further comprise:

setting a first container object retention period associated with the first container object to a second container object retention period associated with a second container object storing chunks for a second application object including a reference to one of the referenced chunks in the first container object; and deleting the first container object in response to an age of the first container object exceeding the first container object retention period.

15. A method for managing data in objects in storage, comprising:

maintaining reference counts for referenced chunks in a container object indicating a number of references to the referenced chunks in at least one application object resulting from deduplication;

indicating the container object as reclaim eligible while the reference counts for at least one of the referenced chunks for the container object is at least one;

decrementing a reference count for one of the referenced chunks in the container object in response to the at least one application object expiring; and indicating the container object, including chunks for the container object, as eligible for deletion when the reference counts for the referenced chunks in the container object are zero and the container object is indicated as reclaim eligible.

16. The method of claim 15, wherein the container object is indicated as reclaim eligible in response to one of:

an age of the container object in storage exceeds an age threshold; and a threshold percent of the chunks of the container object have reference counts of zero.

17. The method of claim 15, wherein the container object comprises a first container object, further comprising:

receiving a chunk in the first container object;

determining whether the first container object is reclaim eligible;

storing, in a second container object, the received chunk matching the chunk in the first container object in response to determining that the first container object is indicated as reclaim eligible; and storing a reference to the chunk in the first container object matching the received chunk in response to determining that the first container object is not indicated as reclaim eligible.

18. The method of claim 15, wherein the container object comprises a first container object, further comprising:

determining whether a duration of the first container object exceeds a retention period;

copying chunks in the first container object having a reference count greater than zero to a second container object in the storage; and indicating the first container object as eligible for deletion in response to the chunks in the first container object having the reference count greater than one copied to the second container object.

19. The method of claim 15, wherein the container object comprises a first container object, further comprising:

indicating the first container object as reclaim eligible in response to the container object being in storage for longer than a first retention period; and in response to the first container object being in the storage longer than a second retention period, performing:

copying chunks in the first container object having a reference count greater than one to a second container object; and indicating the first container object as eligible for deletion in response to the chunks in the first container object having the reference count greater than one copied to the second container object.

20. The method of claim 15, wherein the container object comprises a first container object associated with a first application object, further comprising:

setting a first container object retention period associated with the first container object to a second container object retention period associated with a second container object storing chunks for a second application object including a reference to one of the referenced chunks in the first container object; and deleting the first container object in response to an age of the first container object exceeding the first container object retention period.

* * * * *